(12) United States Patent
Kawakita

(10) Patent No.: US 11,913,892 B2
(45) Date of Patent: Feb. 27, 2024

(54) CONDENSATION DETECTION ELEMENT

(71) Applicant: NATIONAL INSTITUTE FOR MATERIALS SCIENCE, Ibaraki (JP)

(72) Inventor: Jin Kawakita, Ibaraki (JP)

(73) Assignee: NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 465 days.

(21) Appl. No.: 17/292,947

(22) PCT Filed: Nov. 11, 2019

(86) PCT No.: PCT/JP2019/044040
§ 371 (c)(1),
(2) Date: May 11, 2021

(87) PCT Pub. No.: WO2020/100778
PCT Pub. Date: May 22, 2020

(65) Prior Publication Data
US 2022/0003701 A1 Jan. 6, 2022

(30) Foreign Application Priority Data
Nov. 12, 2018 (JP) ................. 2018-212358

(51) Int. Cl.
*G01N 25/66* (2006.01)
*G01N 25/56* (2006.01)
(Continued)

(52) U.S. Cl.
CPC ............. *G01N 25/66* (2013.01); *G01N 25/56* (2013.01); *G01N 27/048* (2013.01); *G01N 27/30* (2013.01); *G01N 27/403* (2013.01)

(58) Field of Classification Search
CPC ...... G01N 25/66; G01N 25/56; G01N 27/048; G01N 27/30; G01N 27/403
See application file for complete search history.

(56) References Cited

U.S. PATENT DOCUMENTS 11,486,843 B2 * 11/2022 Kawakita ............. G01N 27/048
2005/0254552 A1    11/2005 Bruce et al.
(Continued)

FOREIGN PATENT DOCUMENTS

WO    2016/013544    1/2016
WO    2017/213118    12/2017

OTHER PUBLICATIONS

Notice of Reasons for Refusal dated Nov. 30, 2021 in corresponding Japanese Patent Application No. 2020-555665, with English translation.
(Continued)

*Primary Examiner* — Ryan D Walsh
(74) *Attorney, Agent, or Firm* — Wenderoth, Lind & Ponack, L.L.P.

(57) ABSTRACT

A condensation detection element comprises a condensation detection unit, the condensation detection unit being formed on a first substrate unit, and a peripheral circuit unit, the peripheral circuit unit being formed on a second substrate unit. The condensation detection unit comprises a thin wire electrode of a first metal and a thin wire electrode of a second metal. The condensation detection unit is configured to detect the presence or absence of water droplet that comes into contact with the thin wire electrode of the first metal and the thin wire electrode of the second metal by a current flowing between the thin wire electrode of the first metal and the thin wire electrode of the second metal. The first substrate unit has a higher thermal conductivity and a lower heat capacity than the second substrate unit.

16 Claims, 13 Drawing Sheets

(51) Int. Cl.
    *G01N 27/04*    (2006.01)
    *G01N 27/30*    (2006.01)
    *G01N 27/403*    (2006.01)

(56) References Cited

U.S. PATENT DOCUMENTS

| | | |
|---|---|---|
| 2008/0148842 A1 | 6/2008 | Oda |
| 2011/0033764 A1* | 2/2011 | Wang .................. G01N 27/121 |
| | | 429/522 |
| 2017/0167995 A1 | 6/2017 | Kawakita et al. |
| 2019/0178621 A1* | 6/2019 | Kawakita ........... G01N 15/1031 |
| 2019/0310213 A1 | 10/2019 | Kawakita et al. |

OTHER PUBLICATIONS

Communication Pursuant to Article 94(3) EPC dated Feb. 3, 2023 in corresponding European Patent Application No. 19884259.3.
International Search Report dated Feb. 4, 2020 in corresponding International Application No. PCT/JP2019/044040.
Extended European Search Report dated Jun. 27, 2022 in corresponding European Patent Application No. 19884259.3.
Communication pursuant to Article 94(3) EPC dated Jul. 26, 2023 in corresponding European Patent Application No. 19884259.3.

\* cited by examiner

Fig. 1(a)
Fig. 1(b)
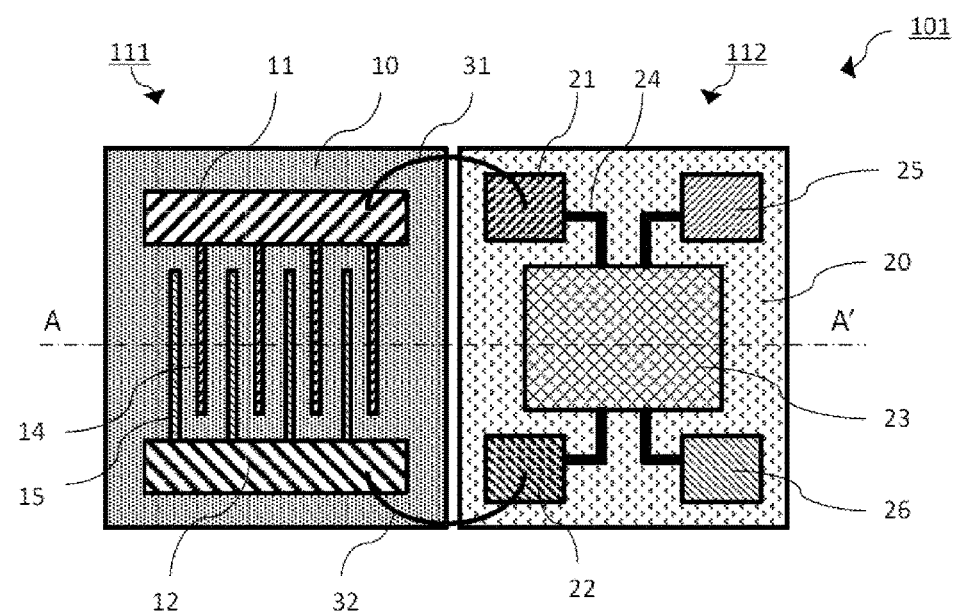
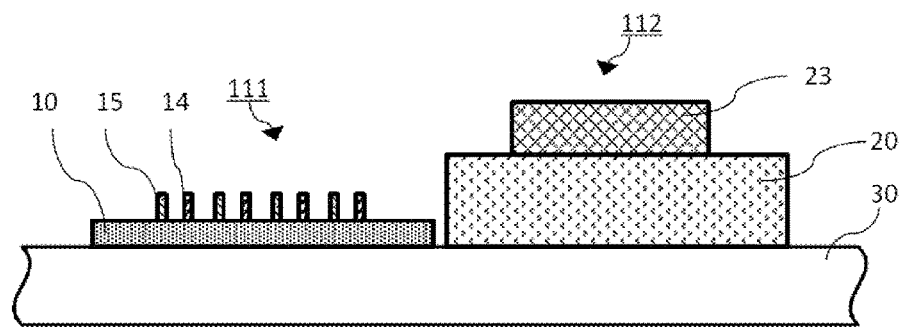

CONDENSATION DETECTION ELEMENT

TECHNICAL FIELD

The present invention relates to a condensation detection element, more particularly, a condensation detection element that measures condensation on an object of interest with high sensitivity, high accuracy, and quickly.

BACKGROUND ART

Condensation on a surface of an object causes mold, rust, and scattering of light. For example, condensation on a wall encourages mold growth since mold acquires nutrients from contamination attached to the surface of the wall. Condensation on a metal causes rust due to corrosion. Condensation in a pantry reduces the tastes and quality of foods. Condensation in a pantry also tends to cause hygienic problems such as mold on foods. Condensation on a transparent member such as a window causes mist. Condensation on lens due to a high humidity causes a scattering of light incident on the lens, which results in deterioration of imaging performance of the lens such as distortion of an image. When each water droplet caused by condensation has a small size, the water droplets look like flare and reduce contrast in an image.

Because of these problems, it is often required to prevent condensation, but it is not preferable to dehumidify constantly beyond necessity from viewpoints of equipment and energy saving.

Therefore, it is important to detect condensation with accuracy and quickly (high responsivity). If the occurrence of condensation is detected accurately and quickly, it is possible to take measures efficiently against condensation, which results in energy saving. Herein, accurate detection of condensation indicates that condensation is detected with high sensitivity and high accuracy.

Humidities are often monitored as a technique to detect condensation.

As a sensor for monitoring humidities (humidity sensor), for example, there is known a sensor that detects a humidity according to changes in electrical resistance (impedance) or in capacitance of a sensor element (dryness/wetness responsive unit).

Humidity sensors of electrical resistance type typically use a polymer or ceramics as a dryness/wetness responsive material for a sensor element. Those materials are inexpensive and have a simple structure, which enables cost reduction by mass production. However, there is a large time-dependent change in humidity sensors of electrical resistance type, and in many cases, such humidity sensors are highly temperature-dependent and require temperature correction. In addition, humidity sensors of electrical resistance type show large variations in accuracy (about ±5 to 15% RH) and slow responsivity (30 seconds to several minutes or more).

Humidity sensors of capacitance type typically use a polymer film as a dryness/wetness responsive material for a sensor element. Humidity sensors of capacitance type have higher responsivity (usually around several seconds to 10 seconds) than humidity sensors of electrical resistance type and are excellent in accuracy, reproducibility, and reliability but require a high production cost.

Furthermore, when a relative humidity is 100%, that is, when condensation occurs all over the sensor, in other words, in a condition where a sensor is covered with water, neither humidity sensor of electrical resistance type nor capacitance type can measure appropriately. Under such a condition, both types of humidity sensors may not return to the dry state and become unusable. Still further, both types of humidity sensors require an external drive power source for driving each sensor, which makes the device large and complicated.

As described above, humidity sensors have various problems. Furthermore, humidity sensors do not detect condensation in a direct manner. Accordingly, it is inherently difficult for humidity sensors to measure condensation with accuracy and quickly.

For example, when a humidity is monitored to detect condensation in a pantry, even when the humidity is monitored with high accuracy and quickly (high speed and responsivity), condensation is not always detected accurately and quickly because the humidity and condensation do not always have a one to one relation. In other words, condensation occurs under the influence of not only humidities but also various factors such as foreign substances in the air and the dirt, shape, and hydrophobicity of the surface of an object where condensation occurs. For this reason, it is difficult to detect condensation accurately and quickly by monitoring only humidities.

There is a method to detect condensation by monitoring various factors related to condensation as well as humidities. On the other hand, there is a more direct method to detect droplets (water droplets) caused by condensation.

Since droplets are measured directly by this method, the method has potential for measuring condensation with accuracy and quickly. Patent Literature 1 and Patent Literature 2, for example, disclose a droplet detector.

CITATION LIST

Patent Literature

Patent Literature 1: WO 2016/13544 A1
Patent Literature 2: WO 2017/020930 A1

SUMMARY OF INVENTION

Technical Problem

However, when monitoring condensation with a droplet detector, results detected by the droplet detector sometimes differ from an actual state of condensation on an object of interest. Furthermore, accuracy and quickness (high speed and responsivity) of the condensation detection are not always satisfactory.

An object of the present invention is to provide a condensation detector that enables accurate and quick measurement and detection of condensation on an object of interest.

Solution to Problem

Configurations of the present invention are now described.
(Configuration 1)
A condensation detection element comprising
 a condensation detection unit, the condensation detection unit being formed on a first substrate unit, and
 a peripheral circuit unit, the peripheral circuit unit being formed on a second substrate unit,
 wherein the condensation detection unit comprises a thin wire electrode of a first metal and a thin wire electrode of a second metal, the second metal being different from the first metal, wherein the thin wire electrode of the first metal and the thin wire electrode of the second metal are disposed in juxtaposition with each other, wherein the condensation detection unit is configured to detect the presence or absence of water droplet that comes into contact with the thin wire electrode of the first metal and the thin wire electrode of the second metal by a current flowing between the thin wire electrode of the first metal and the thin wire electrode of the second metal, wherein the peripheral circuit unit comprises at least an output unit that outputs an electrical signal when condensation due to the water droplet is detected, and wherein the first substrate unit has a higher thermal conductivity and a lower heat capacity than the second substrate unit.

(Configuration 2)

The condensation detection element according to configuration 1, wherein the first substrate unit has a higher thermal conductivity per unit area and a lower heat capacity per unit area than the second substrate unit.

(Configuration 3)

The condensation detection element according to configuration 1 or 2, wherein the first substrate unit has a structure that comes into direct contact with an object of interest.

(Configuration 4)

The condensation detection element according to configuration 1 or 2, wherein the first substrate unit comprises a heat sink unit.

(Configuration 5)

The condensation detection element according to any one of configurations 1 to 4, wherein the first substrate unit is surrounded by a member having a lower thermal conductivity than the first substrate unit except for a side in contact with an object of interest.

(Configuration 6)

The condensation detection element according to any one of configurations 1 to 5, wherein the first substrate unit is surrounded by the second substrate unit.

(Configuration 7)

The condensation detection element according to any one of configurations 1 to 6, wherein the first substrate unit is disposed separately from the second substrate unit.

(Configuration 8)

The condensation detection element according to any one of configurations 1 to 7, wherein the first substrate unit has a smaller thickness than the second substrate unit.

(Configuration 9)

The condensation detection element according to any one of configurations 1 to 8, wherein the condensation detection unit is electrically connected to the peripheral circuit unit by a bonding wire.

(Configuration 10)

The condensation detection element according to any one of configurations 1 to 9, wherein the peripheral circuit unit comprises at least one selected from a group consisting of electrical signal amplification unit, current voltage conversion unit, analog digital signal conversion unit, binarization unit for 0/1 signals, wireless transmission unit, signal terminal unit, and power supply unit.

(Configuration 11)

The condensation detection element according to any one of configurations 1 to 10, wherein the first metal is selected from a group consisting of gold, platinum, silver, titanium, an alloy thereof, and carbon.

(Configuration 12)

The condensation detection element according to any one of condensations 1 to 11, wherein the second metal is selected from a group consisting of silver, copper, iron, zinc, nickel, cobalt, aluminum, tin, chromium, molybdenum, manganese, magnesium, and an alloy thereof.

(Configuration 13)

The condensation detection element according to any one of configurations 1 to 12, wherein the spacing between the thin wire electrode of the first metal and the thin wire electrode of the second metal is in a range of 5 nm or more and 200,000 nm or less.

(Configuration 14)

The condensation detection element according to any one of condensations 1 to 13, comprising a plurality of at least one selected from a group consisting of the thin wire electrode of the first metal and the thin wire electrode of the second metal, wherein the thin wire electrode of the first metal extends from a first side towards a second side that is opposite to the first side and the thin wire electrode of the second metal extends from the second side towards the first side such that the thin wire electrode of the first metal and the thin wire electrode of the second metal are arranged in parallel with each other.

(Configuration 15)

The condensation detection element according to any one of configurations 1 to 14, wherein the first substrate unit comprises a member in which an insulating film is formed on at least one material selected from a group consisting of aluminum, copper, silicon, diamond, and graphite, or on an alloy or compound comprising at least one selected from a group consisting of aluminum, copper, silicon, and carbon.

(Configuration 16)

The condensation detection element according to any one of configurations 1 to 15, wherein the second substrate unit comprises at least one member selected from a group consisting of resin, glass, and ceramics.

Advantageous Effects of Invention

According to the present invention, there is provided a condensation detector that enables accurate and quick measurement and detection of condensation on an object of interest.

BRIEF DESCRIPTION OF DRAWINGS

FIG. 1(a) is a schematic plan view and FIG. 1(b) is a schematic cross-sectional view each showing a structure of a condensation detection element of the present invention.

DESCRIPTION OF EMBODIMENTS

First Embodiment

Figure 2:
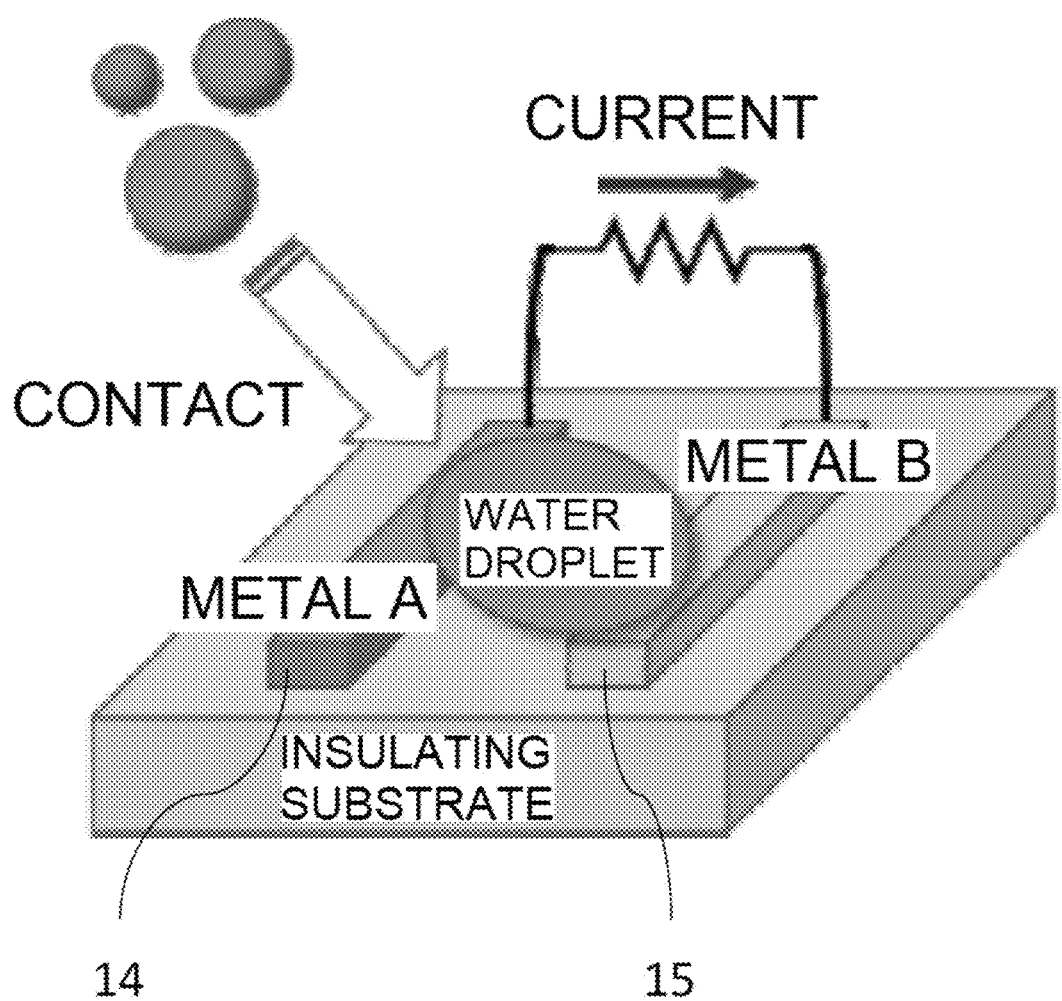
FIG. 2 is an illustrative drawing for describing the principles of condensation detection of the present invention.

A first embodiment for carrying out the present invention will now be described with reference to the drawings.

Condensation is a phenomenon in which multiple minute droplets (water droplets) are formed on an object of interest when viewed microscopically.

Therefore, the inventor has attempted to detect condensation with a droplet sensor (droplet detection element) that detects minute droplets.

However, a time at which the inventor visually observes the occurrence of condensation on an object of interest does not match a time at which the droplet sensor detects the occurrence of condensation. At first, the inventor has considered that this time gap is caused by different sizes of droplets to be detected and have evaluated the droplets in various manners. However, such an attempt did not resolve the time gap. The inventor has studied in detail and found that not only the timing of detecting the occurrence of condensation but also the detection of condensation itself may differ between the visual observation and the droplet sensor.

As a result of intensive study, the inventor has found that this difference is caused by a difference between the temperature of a portion in the droplet sensor that detects droplets and the temperature of an object of interest. The inventor has studied further and found that even when the temperature of the droplet sensor agrees with the temperature of an object of interest, the portion in the droplet sensor that detects droplets and the object of interest differ in temperature under influences of heat from peripheral circuits and the like and that the influences make it difficult for the droplet sensor to detect condensation accurately.

Based on the above findings, the present invention provides a condensation detection element having a structure in which the temperature of an object of interest and the temperature of a portion that detects droplets (water droplets) fall within an allowable range for condensation detection. The condensation detection element enables detection of condensation on an object of interest with high accuracy, high sensitivity, and high responsivity (high speed).

As shown in FIGS. 1(a) and (b), a condensation detection element 101 according to this embodiment of the present invention comprises a condensation detection unit 111 formed on a first substrate 10 (first substrate unit 10) and a peripheral circuit unit 112 formed on a second substrate 20 (second substrate unit 20). FIG. 1(a) is a plan view, and FIG. 1(b) is a cross-sectional view taken along line A-A' of FIG. 1(a).

The first substrate unit 10 herein has a higher thermal conductivity and a lower heat capacity than the second substrate unit 20. Furthermore, the first substrate unit 10 is spatially separated from the second substrate unit 20. Accordingly, it is less likely that heat from peripheral circuits affects the temperature of a portion that detects water droplets caused by condensation.

In addition, the first substrate unit 10 is formed directly on an object of interest 30. Due to such a structure, the temperature of the portion that detects water droplets caused by condensation is substantially equal to the temperature of an object of interest.

For the reasons stated above, the condensation detection element 101 enables detection of condensation on an object of interest with high accuracy, high sensitivity, and high responsivity (high speed).

The condensation detection unit 111 is provided with a water droplet detection unit that detects the presence or absence of water droplets. The water droplet detection unit comprises a thin wire electrode of a first metal (first thin wire electrode) 14 and a thin wire electrode of a second metal (second thin wire electrode) 15, wherein the second metal is different from the first metal, and wherein the first thin wire electrode 14 and the second thin wire electrode 15 are disposed in juxtaposition with each other. The first thin wire electrode 14 herein is electrically connected to a first electrode 11 disposed on the first substrate unit 10, and the second thin wire electrode 15 is electrically connected to a second electrode 12 disposed on the first substrate unit 10.

When water droplets are adhered to or come into contact with the first thin wire electrode 14 and the second thin wire electrode 15, a galvanic current flows between the first thin wire electrode 14 and the second thin wire electrode 15, as shown in FIG. 2, due to a difference in electrochemical potential between the metals. The condensation detection element 101 according to this embodiment of the present invention monitors the galvanic current to detect condensation.

Ultrapure water has a low conductivity and provides insulation. However, since water droplets contain hydrogen ions of at least $10^{-7}$ mol/L and hydroxide ions of at least $10^{-7}$ mol/L and when water droplets contain a small quantity of electrolytic components due to due to contamination, a measurable galvanic current flows.

The second thin wire electrode 15 herein may be a semiconductor such as titanium oxide. In a case where the second thin wire electrode 15 is a semiconductor, a difference in electrochemical potential occurs under light due to photoelectric effects, which causes a current to flow between the first thin wire electrode 14 and the second thin wire electrode 15 connected to each other by a conductive liquid.

In this structure, by using electrodes with a small width, or thin wire electrodes, it is possible to increase a length of the portions of both the electrodes facing each other with approaching each other with respect to the area of the water droplet detection unit. Thus, it is possible to increase in the capacity of the cell, in other words, it is possible to increase in the galvanic current to be taken out.

As a configuration for increasing a length (hereinafter, referred to as an approaching distance) of approached portions between thin wire electrodes by arranging such thin wire electrodes in parallel with and approached each other, for example, a comb structure or a double spirally-wound structure may be employed. In addition, a structure itself for increasing an approaching distance between two electrodes inside a predetermined plane area as possibly as can be is well known in the field of a semiconductor device and the like, and thus, such a structure may be employed as is necessary. In the present invention, "juxtaposing thin wire electrodes on a substrate" is not for specifying mutual directions of a plurality of thin wire electrodes placed on the substrate but represents that the thin wire electrodes are arranged on a same plane of the substrate with being separate from each other.

In a case where the first thin wire electrode 14 is used as a cathode, examples of the material for the first thin wire electrode 14 include gold (Au), platinum (Pt), silver (Ag), titanium (Ti), an alloy thereof, and carbon (C) and an allotrope thereof.

In a case where the second thin wire electrode 15 is used as an anode, examples of the material for the second thin wire electrode 15 include silver (Ag), copper (Cu), iron (Fe), zinc (Zn), nickel (Ni), cobalt (Co), aluminum (Al), tin (Sn), chromium (Cr), molybdenum (Mo), manganese (Mn), magnesium (Mg), and an alloy thereof. It should be noted that, in a case where silver and an alloy thereof are used as the first thin wire electrode 14, a material other than silver and an alloy thereof is used as the material for the second thin wire electrode 15.

The output (current) depends on the combination of metal materials for the thin wire electrodes. For example, when the combinations of silver/iron and gold/silver are compared with each other, the current value to be obtained in the combination of silver/iron is larger than that in the combination of gold/silver because the combination of silver/iron has a corrosion rate per area larger than that in the combination of gold/silver. On the other hand, in the combination of gold/silver, the service life is longer because the combination of gold/silver has smaller consumption of the electrodes. In this regard, silver has an effect of preventing the generation of mold at a place to detect water droplets, and therefore, it is preferable to use silver as the first thin wire electrode 14 or the second thin wire electrode 15.

Further, in a case where the first electrode 11 is made of the same material as that of the first thin wire electrode 14, and the second electrode 12 is made of the same material as that of the second thin wire electrode 15, the production process of the condensation detection element 101 is simplified, and therefore, this is preferable.

A spacing between the first thin wire electrode 14 and the second thin wire electrode 15 is preferably from 5 nm to 200,000 nm (200 μm). With a spacing between the thin wire electrodes less than 5 nm, the production yield decreases even when a semiconductor manufacturing process is applied and a relative interval varies considerably, which decreases sensitivity and accuracy of condensation detection. On the other hand, with a spacing between the thin wire electrodes over 200,000 nm, it is difficult to detect the kind of condensation that causes, for example, a misty window based on sizes of water droplets to be detected.

The first thin wire electrode 14 and the second thin wire electrode 15 preferably have a width from 50 nm to 100 μm. When the first thin wire electrode 14 and the second thin wire electrode 15 have a width less than 50 nm, electrical resistance becomes too large to produce an output and tends to cause a large time-dependent change. Such a small width also tends to break wires and increases the frequency of defects. On the other hand, when the first thin wire electrode 14 and the second thin wire electrode 15 have a width over 100 μm, the condensation detection unit 111 is required to expand its region, which makes it difficult to downsize the condensation detection element 101.

The first thin wire electrode 14 and the second thin wire electrode 15 preferably have a thickness from 10 nm to 300 nm. When the first thin wire electrode 14 and the second thin wire electrode 15 have a thickness less than 10 nm, electrical resistance becomes too large to produce an output and tends to cause a large time-dependent change. On the other hand, when the first thin wire electrode 14 and the second thin wire electrode 15 have a thickness over 300 nm, the condensation detection unit 111 increases in heat capacity.

An interval between the first thin wire electrode 14 and the second thin wire electrode 15 may be a void space. Alternatively, an insulator may be embedded in the space. In a case where there is a void space, minute water droplets formed in the space make a pool of water. In a case where an insulator is embedded, minute water droplets are piled on the insulator. It is possible to control the shape of piled droplets by water repellency (contact angle of water droplets) of the surface of the insulator.

In the condensation detection unit 111, when a galvanic current flows repeatedly, the metal of the anode electrode which is the second thin wire electrode 15 is ionized, and accordingly, the anode electrode (second thin wire electrode 15) is gradually consumed. In addition, in a case where a long-term use under an environment having high humidity and a large salt damage is assumed, particularly, in a condensation detection element 101 having thin electrodes for increasing the laying density, there is a possibility that the inter-thin wire electrode distance is gradually increased or the thin wire electrode is cut out in accordance with the consumption of the anode electrode.

In order to address these problems with the laying density of the thin wire electrodes maintained, for example, the thickness of the anode electrode (second thin wire electrode 15) may be increased, or the width of the anode electrode may be increased instead of the width of the cathode electrode (first thin wire electrode 14) may be decreased.

In a case where the inter-thin wire electrode distance is very short, the influence of a slight increase in the inter-thin wire electrode distance according to the consumption of the anode electrode on a result of the measurement increases. In a case where such an influence matters, for example, by using a principle that the consumption of the metal of the anode electrode is in proportion to the time integral of a galvanic current, a countermeasure of performing compensation calculation for the result of the measurement as the whole measurement system may be established.

As the inter-thin wire electrode distance is decreased, conductive fine particles such as metal powders present in the air and the like are attached between the thin wire electrodes, and accordingly, a possibility of forming a short circuit increases. Regarding this problem, a countermeasure, for example, arranging a meshed body on the upper side face of the thin wire electrodes so that fine particles do not arrive at the thin wire electrodes, can be set up.

The first substrate 10 preferably consists of a member in which an insulating film is formed on at least one material selected from a group consisting of aluminum, copper, silicon, diamond, and graphite, or on an alloy or compound comprising at least one selected from a group consisting of aluminum, copper, silicon, and carbon.

These materials have adequate rigidity as a substrate and a high thermal conductivity. What is more, these materials have a relatively low heat capacity per unit volume.

In particular, aluminum and copper have moderate flexibility which is preferable in obtaining a contact surface that is directly attached to an object of interest. This is because even when the object of interest has a complex and curved measurement surface, aluminum and copper fit into the measurement surface. Accordingly, it is also preferable to employ thin film aluminum or aluminum tape for the first substrate 10.

In order to increase the thermal conductivity and to decrease the heat capacity, the first substrate 10 preferably has a small thickness to such an extent that the substrate ensures rigidity. For example, the first substrate 10 may have a thickness from 50 μm to 1500 μm.

Examples of the insulating film in the first substrate 10 include oxide films such as silicon oxide ($SiO_x$), aluminum oxide ($Al_2O_3$), silicon nitride ($SiN_x$), silicon oxynitride (SiON), and hafnium oxide ($HfO_x$) and also include nitride films and oxynitride films.

The insulating film preferably has a thickness from 10 nm to 200 nm. The insulating film having a thickness less than 10 nm tends to have poor insulating properties and increases the frequency of insulation defects due to pinholes or the like. The insulating film having a thickness over 200 nm is not preferable because such an insulating film increases the thermal conductivity of the condensation detection unit 111 and decreases the heat capacity.

As described above, the condensation detection unit 111 has a simple structure and a volume relatively small with respect to an area that affects detection sensitivity of water droplets and can be constituted of a material with a high thermal conductivity and a relatively low heat capacity. Accordingly, the condensation detection unit 111 has a structure suitable for reducing the heat capacity. What is more, the condensation detection unit 111 has an excellent thermal conductivity with respect to an object of interest. Therefore, it is easier to make the temperature of the condensation detection unit 111 substantially equal to the temperature of the object of interest.

The peripheral circuit unit 112 consists of a peripheral circuit having at least an output unit formed on the second substrate 20 (second substrate unit 20).

As an exemplary aspect, the peripheral circuit unit 112 according to the first embodiment is illustrated (in FIG. 1(a)) as a member consisting of peripheral circuit input electrodes 21 and 22, a peripheral circuit main part 23, and output electrodes 25 and 26. Herein, the peripheral circuit main part 23, the peripheral circuit input electrodes 21 and 22, and the output electrodes 25 and 26 are electrically connected to each other by wires 24, but the output electrodes 25 and 26 may be replaced with wireless output circuits.

The peripheral circuit main part 23 comprises at least a circuit that outputs a current signal of water droplets measured by the condensation detection unit 111 as a condensation detection signal and comprises at least one of an electrical signal amplifier circuit (electrical signal amplification unit), current voltage conversion circuit (current voltage conversion unit), analog digital signal conversion circuit (analog digital signal conversion unit), binarization circuit (binarization unit for 0/1 signals), power supply circuit (power supply unit), wireless transmission circuit (wireless transmission unit), and signal terminal unit. In FIG. 1(a), some parts of the signal terminal unit are illustrated as the output electrodes 25 and 26 disposed on the outside of the peripheral circuit main part 23 via the wires 24.

The second substrate 20 is an electrically insulating substrate having a lower thermal conductivity and a higher heat capacity rigidity than the first substrate 10.

A specific member constituting the second substrate 20 may include at least one member selected from a group consisting of resin such as acrylic and polycarbonate, glass such as quartz glass and soda lime glass, and ceramics such as silicon carbide (SiC).

Rubber such as isoprene rubber and silicone rubber may be employed as the second substrate 20. In a case where rubber is employed, since rubber typically has low adhesion to wires and electrodes, it is preferable to apply a method for improving adhesion of rubber to wires or electrodes, for example, embedding wires or electrodes in rubber.

These materials are known to have a relatively low thermal conductivity. Note that materials with a low thermal conductivity typically have high electrical insulating properties.

Furthermore, it is preferable that the second substrate 20 has a lower thermal conductivity per unit area and a higher heat capacity per unit area than the first substrate 10. In other words, it is preferable that the first substrate unit 10 has a higher thermal conductivity per unit area and a lower heat capacity per unit area than the second substrate unit 20.

When the second substrate 20 has a larger thickness than the first substrate 10, it is easier to make the thermal conductivity of the first substrate 10 higher and the heat capacity of the first substrate 10 lower. Accordingly, it is preferable that the first substrate 10 should have a smaller thickness than the second substrate 20.

The first electrode 11 and the peripheral circuit input electrode 21 are electrically connected by a wire 31, and the second electrode 12 and the peripheral circuit input electrode 22 are electrically connected by a wire 32. It is preferable that those electrodes should be connected by a method that enables a low thermal conductivity, and an example of such a method includes connection by a bonding wire. In this case, even with thin wires, it is possible to connect electrodes electrically, which easily suppresses heat conduction. Other examples of the method include contact with a needle, clamp, and terminal. In these cases, the degree of freedom in layout increases since the condensation detection unit 111 and the peripheral circuit unit 112 are made into separate module components and combined when being disposed on an object of interest.

As shown in FIGS. 1(a) and (b), the condensation detection element 101 according to the first embodiment has a structure in which the condensation detection unit 111 and the peripheral circuit unit 112 are spatially and thermally separated. Furthermore, as described above, the first substrate unit 10 has a low heat capacity, a high thermal conductivity, and a structure formed directly on the object of interest 30. The peripheral circuit unit 112 or a heat source has a low thermal conductivity and a higher heat capacity than the first substrate unit 10. Accordingly, the temperature of the portion that detects water droplets caused by condensation is substantially equal to the temperature of an object of interest even when the peripheral circuit unit 112 generates heat.

For the reasons stated above, the condensation detection element 101 enables detection of condensation on an object of interest with high accuracy, high sensitivity, and high responsivity (high speed).

Second Embodiment

Figure 3A:
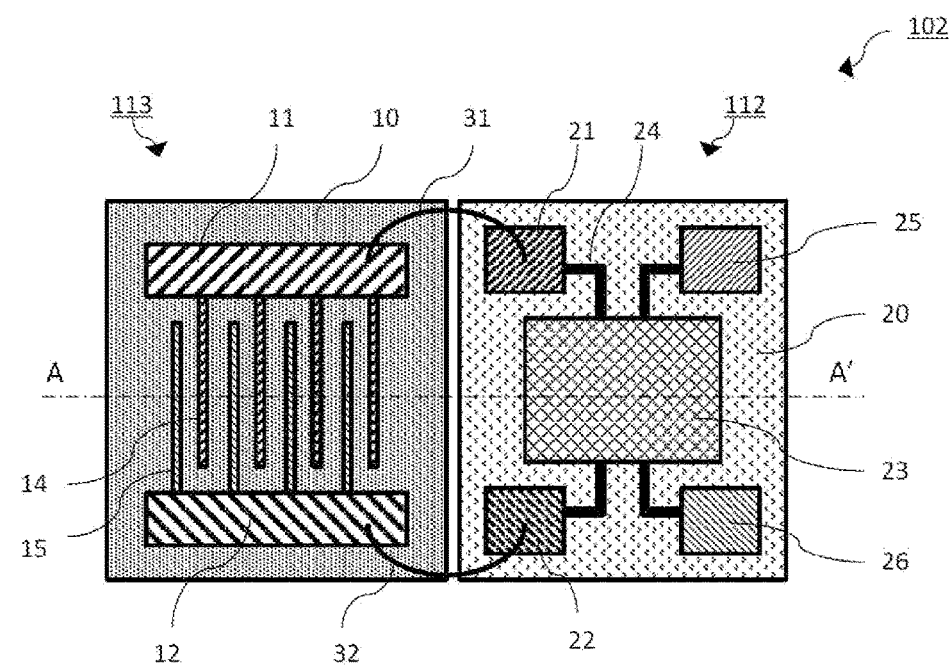
FIG. 3(a) is a schematic plan view and FIG. 3(b) is a schematic cross-sectional view each showing a structure of a condensation detection element of the present invention.
Figure 3B:
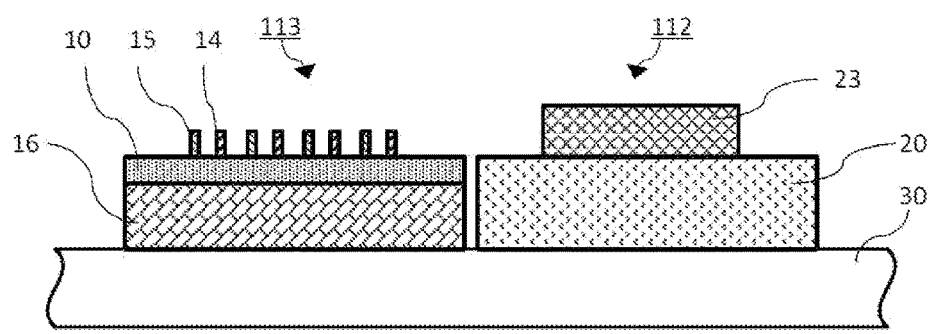

A heat sink may be used to bring the temperature of a condensation detection unit close to the temperature of an object of interest 30. An example of such a configuration will be described in a second embodiment with reference to FIGS. 3(a) and (b).

A condensation detection element 102 according to the second embodiment has a condensation detection unit 113 in which a heat sink 16 is formed between a first substrate 10 and the object of interest 30. Other parts are similar to the first embodiment.

The heat sink 16 is constituted of a material having an excellent thermal conductivity. Specific examples of the material include aluminum, copper, iron, aluminum nitride ($AlN_x$), and silicon nitride ($SiN_x$).

Furthermore, adjusting the material and shape of the heat sink 16 makes it possible to control the heat capacity of the condensation detection unit 113 to a desired value.

The heat sink 16 herein may consist of not only a single material but also a laminated material consisting of a plurality of materials or different materials. The shape of the heat sink 16 is not limited to a cuboid and may vary depending on the environment or the intended use. For example, the heat sink 16 may have a shape of cylinder, hammer head, inverted hammer head, prism, truncated cone, inverted truncated cone, truncated prism, inverted truncated prism, and pin holder. For example, the heat sink 16 may have a shape of inverted hammer head in which the side in contact with the object of interest 30 (lower side) is constituted of a material with a particularly low heat capacity and the upper side is constituted of a material with a high thermal conductivity.

By attaching the heat sink 16 directly to the object of interest 30, the temperature of a portion that detects water droplets caused by condensation is made substantially equal to the temperature of the object of interest 30. Accordingly, the condensation detection element 102 enables detection of condensation on an object of interest with high accuracy, high sensitivity, and high responsivity (high speed).

In addition, due to the heat sink 16, the condensation detection element 102 can make the surface of the first substrate 10 substantially coplanar with the surface of a second substrate 20, which facilitates electrical connections between a first electrode 11 and a peripheral circuit input electrode 21 and between a second electrode 12 and a peripheral circuit input electrode 22. What is more, it is possible to enhance reliability of the electrical connections.

Third Embodiment

It is also efficient to surround a condensation detection unit with a peripheral circuit unit. An example of such a configuration will be described in a third embodiment with reference to FIGS. 4(a) and (b).

A condensation detection element 103 according the third embodiment comprises a condensation detection unit 111 surrounded by a peripheral circuit unit 114. In other words, in the condensation detection element 103, a first substrate unit 10 is surrounded by a second substrate 20. The second substrate 20 has a low thermal conductivity. The condensation detection unit 111 and the peripheral circuit unit 114 are spatially and thermally isolated. Accordingly, the condensation detection unit 111 is less affected by heat generated from a peripheral circuit main part 23. Furthermore, the second substrate 20 having a relatively high heat capacity and a low thermal conductivity acts as a wall to avoid external influences such as wind and makes it possible for the condensation detection unit 111 to detect condensation in an environment close to an object of interest 30.

Figure 4A:
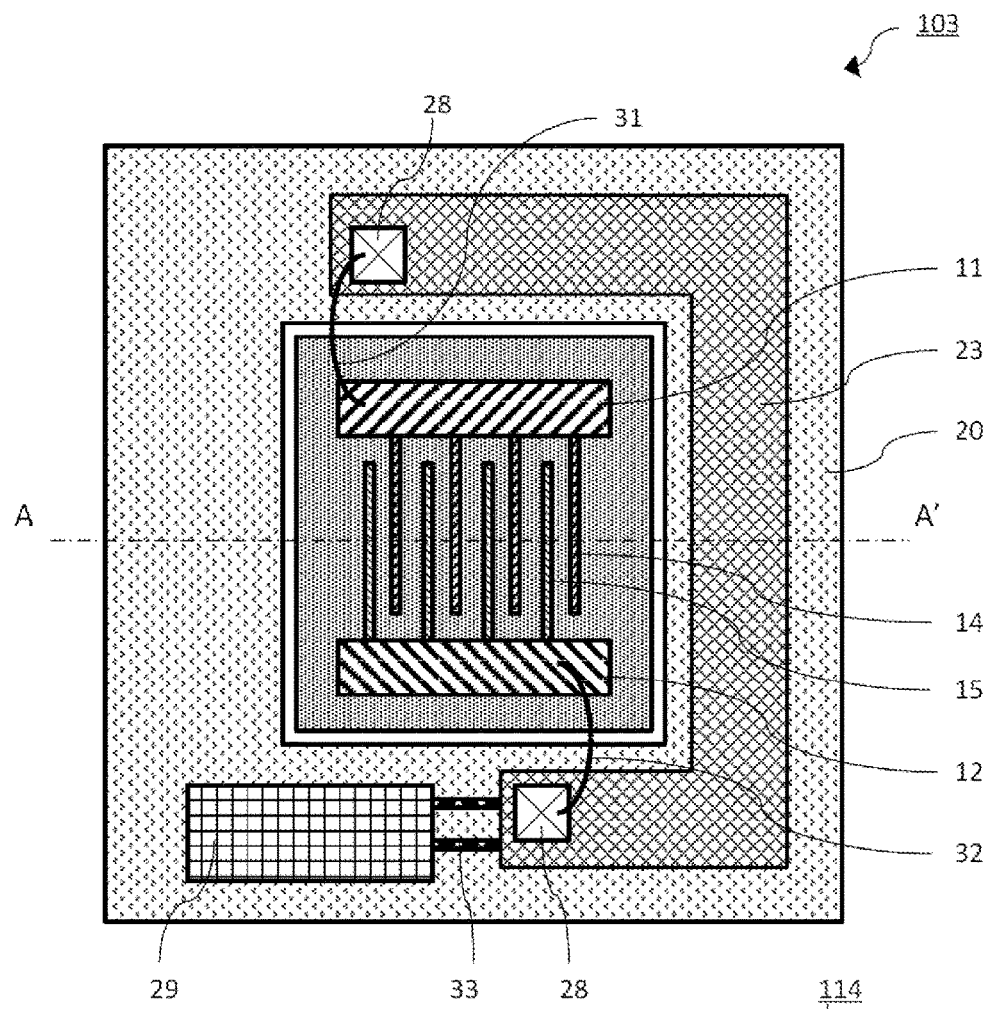
FIG. 4(a) is a schematic plan view and FIG. 4(b) is a schematic cross-sectional view each showing a structure of a condensation detection element of the present invention.
Figure 4B:
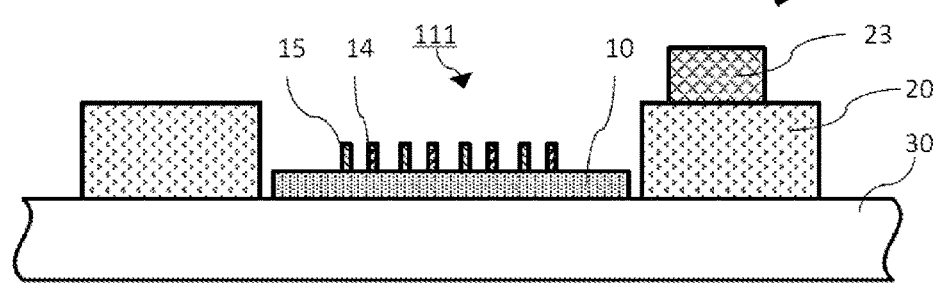

In the example illustrated in FIG. 4(a), a wireless output unit 29 is provided in place of an output electrode, the peripheral circuit main part 23 and the wireless output unit 29 are electrically connected by wires 33, and peripheral circuit input electrodes 28 are incorporated in the peripheral circuit main part 23. Other parts are similar to the first embodiment.

Note that an element which serves as a heat source in the peripheral circuit main part 23 (not shown in Figures) is preferably disposed at a position as far as possible from the condensation detection unit 111.

Fourth Embodiment

Figure 5A:
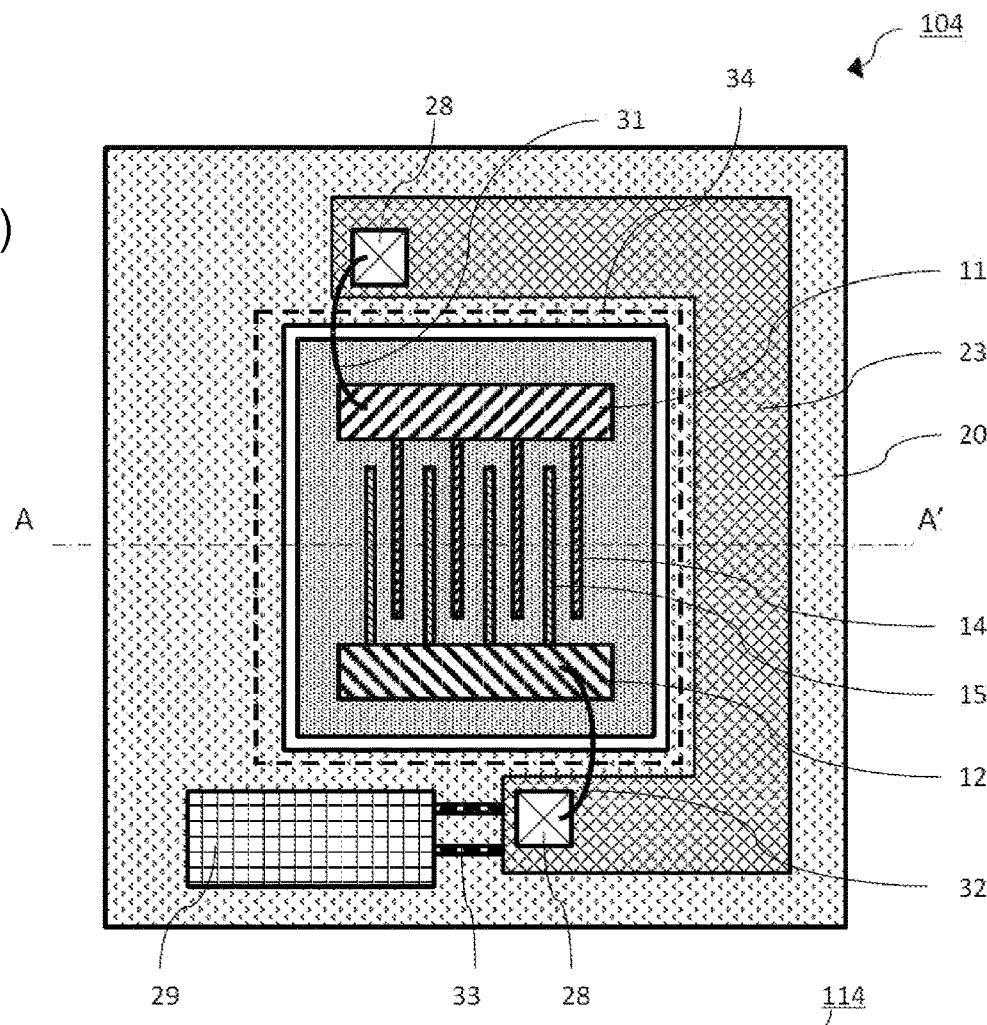
FIG. 5(a) is a schematic plan view and FIG. 5(b) is a schematic cross-sectional view each showing a structure of a condensation detection element of the present invention.
Figure 5B:
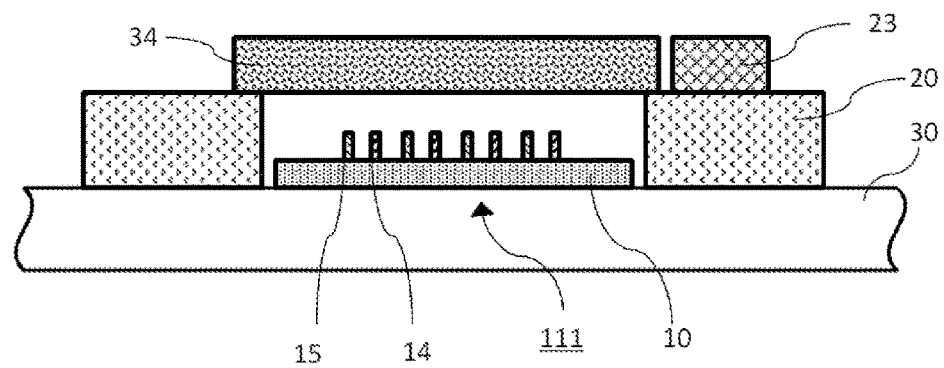

It is also efficient to surround a condensation detection unit by a member having a lower thermal conductivity than a first substrate 10 excluding the side in contact with an object of interest 30. An example of such a configuration will be described in a fourth embodiment with reference to FIGS. 5(a) and (b).

A condensation detection element 104 according to the fourth embodiment is based on the condensation detection element 103 according to the third embodiment. The condensation detection unit 111 in the third embodiment is opened, but a condensation detection unit 111 according to this embodiment has a breathable heat insulating film 34 formed thereon. Furthermore, the condensation detection unit 111 herein is covered with a material having a lower thermal conductivity than the first substrate unit 10 except for the side where the condensation detection unit 111 comes into contact with the object of interest 30. Other parts are similar to the third embodiment.

This structure is even less affected by external influences than the condensation detection element 103. Accordingly, it is possible to detect condensation in an environment close to the object of interest 30.

Examples of the breathable heat insulating film 34 include porous polyurethane and glass fiber. Due to the breathability, an environment where water droplets are formed is substantially equal to that on the object of interest 30.

Fifth Embodiment

Figure 6A:
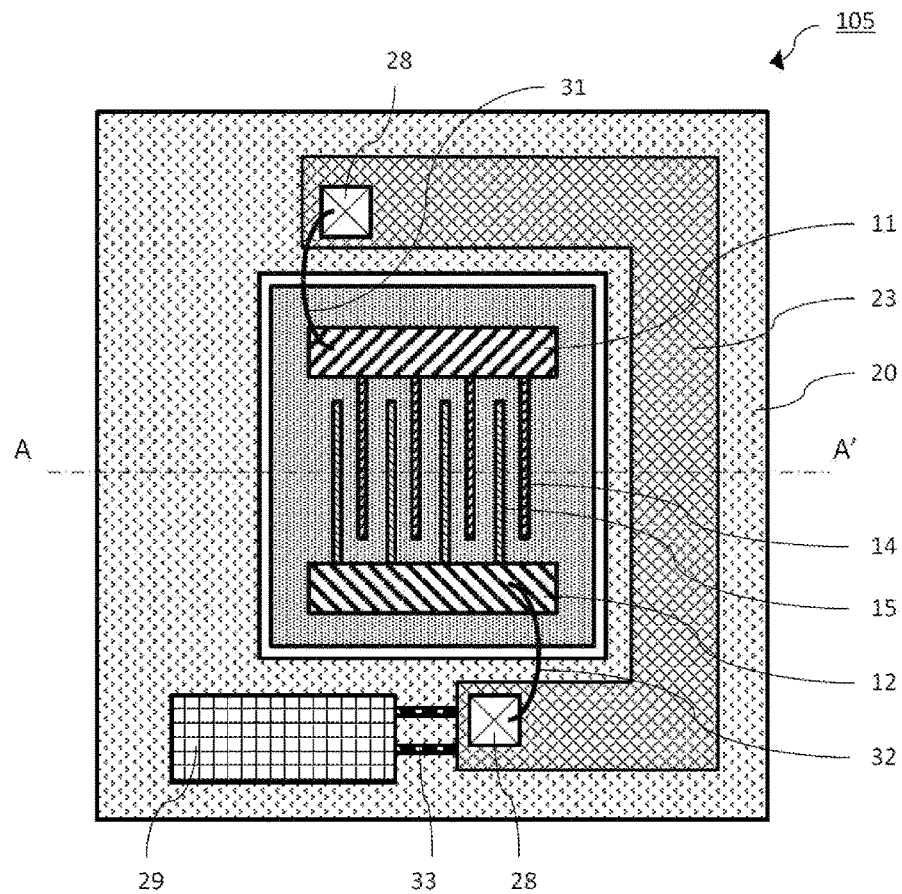
FIG. 6(a) is a schematic plan view and FIG. 6(b) is a schematic cross-sectional view each showing a structure of a condensation detection element of the present invention.
Figure 6B:
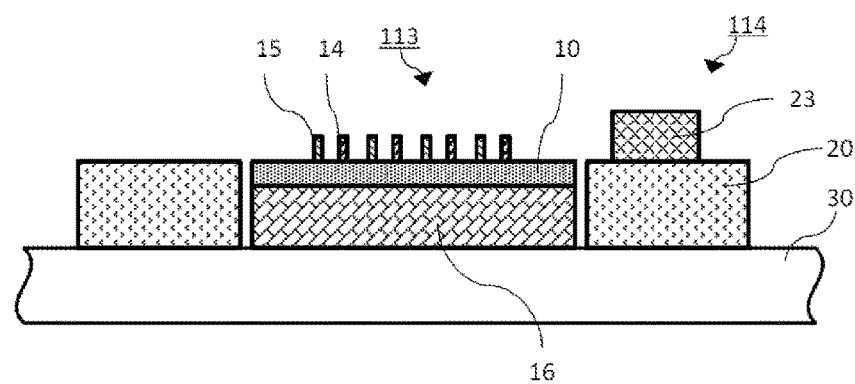

It is also efficient to surround a condensation detection unit by a peripheral circuit unit and to use a heat sink to bring the temperature of the condensation detection unit close to the temperature of an object of interest 30. An example of such a configuration will be described in a fifth embodiment with reference to FIGS. 6(a) and (b).

In a condensation detection element 105 according to the fifth embodiment, a condensation detection unit 113 having a heat sink 16 formed between a first substrate 10 and the object of interest 30 is surrounded by a peripheral circuit unit 114. Other parts are similar to the second embodiment.

This structure is a combination of the second embodiment and the third embodiment and promises effects of both embodiments. In other words, the condensation detection element 105 is less affected by external influences and enables detection of condensation in an environment close to the object of interest 30.

Sixth Embodiment

Figure 7A:
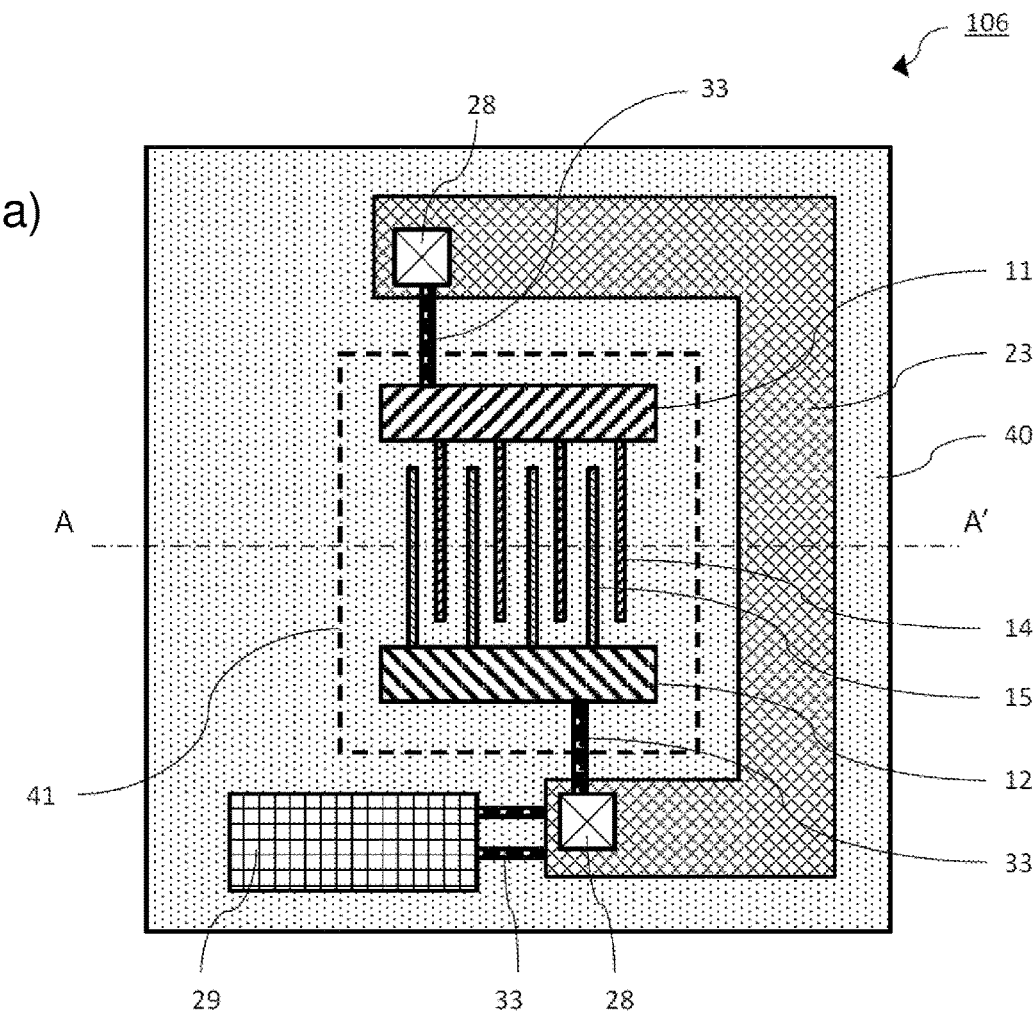
FIG. 7(a) is a schematic plan view and FIG. 7(b) is a schematic cross-sectional view each showing a structure of a condensation detection element of the present invention.
Figure 7B:
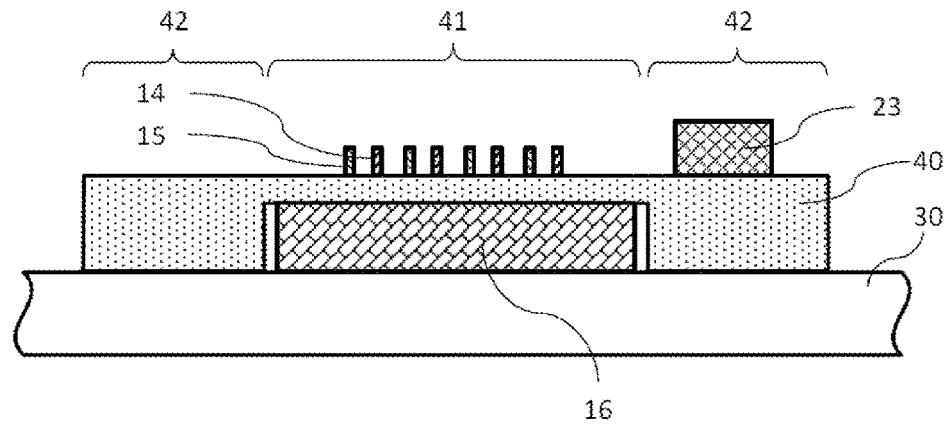

As shown in FIGS. 7(a) and (b), a sixth embodiment is an example of a condensation detection element 106 in which a condensation detection unit (first substrate unit) 41 and a peripheral circuit unit (second substrate unit 42) are formed by a single substrate 40. A void space is formed in a place corresponding to the first substrate unit 41 of the substrate 40. In that space, disposed is a heat sink 16 that comes into contact with the substrate 40 and an object of interest 30. Other parts are based on the second embodiment.

The substrate 40 may employ any substrate as long as it has rigidity and electrical insulating properties that can withstand use as a substrate. The substrate 40 may also employ one that has an insulating film on a conductive base.

Specifically examples of such a substrate include one having an insulating film such as oxide films, nitride films, and oxynitride films (for example, silicon oxide ($SiO_x$), aluminum oxide ($Al_2O_3$), silicon nitride ($SiN_x$), silicon oxynitride (SiON), and hafnium oxide ($HfO_x$)) formed on at least one material selected from a group consisting of aluminum, copper, silicon, diamond, and graphite, or on an alloy or compound comprising at least one selected from a group consisting of aluminum, copper, silicon, and carbon. Also, other examples include at least one member selected from a group consisting of resin such as acrylic and polycarbonate, glass such as quartz glass and soda lime glass, and ceramics such as silicon carbide (SiC).

Due to the heat sink 16, the first substrate unit 41 has a higher thermal conductivity per unit area and a lower heat capacity than the second substrate unit 42. Accordingly, the temperature of a portion in the condensation detection element 106 that detects water droplets caused by condensation is substantially equal to the temperature of the object of interest 30 even when a peripheral circuit main part 23 generates heat.

With such a configuration, the condensation detection element 106 enables detection of condensation on the object of interest 30 with high accuracy, high sensitivity, and high responsivity (high speed).

Furthermore, in the condensation detection element 106, a first electrode 11, a second electrode 12, and peripheral circuit input electrodes 28 are formed coplanarly on the surface of the substrate 40. Accordingly, it is easy to form wires 33 that connect these electrodes, which enhances reliability.

Furthermore, the condensation detection element according to an embodiment of the present invention detects not only condensation on an object of interest as described above but also minute water droplets and water films (not reaching the size of condensation) before condensation occurs on the object of interest by adjusting a spacing between first and second thin wire electrodes (for example, from 20 nm to 5000 nm, preferably from 20 nm to 2000 nm depending on the water wettability of the object of interest). The condensation detection element according to an embodiment of the present invention also enables accurate detection of such minute water droplets and water films in an environment on the object of interest.

As similar to condensation, such minute water droplets and water films more or less affect the formation and growth of rust, the corrosion of members such as metals, changes in frictional force, and the breeding and growth of mold. Accordingly, detecting minute water droplets and water films is useful.

In addition, enabling the detection of such minute water droplets and water films is useful for taking efficient measures to prevent condensation. For example, an air conditioner or a heater may be activated before condensation occurs on an object of interest.

Accordingly, the condensation detection element according to an embodiment of the present invention serves as a detection element that efficiently prevents condensation and as a quantification element associated with phenomena such as the formation and growth of rust, the corrosion of members such as metals, changes in frictional force, and the breeding and growth of mold.

EXAMPLES

Example 1

In Example 1, described is a condensation detection element 106 comprising a condensation detection unit with two electrodes arranged in a comb shape. As a matter of course, the present invention is not limited to this specific aspect. The technical scope of the present invention should be defined by the scope of claims.

A silicon wafer having a thickness of 500 μm and having a silicon oxide film with a thickness of 150 nm was used as a substrate 40. On the silicon wafer, a cathode electrode as a first thin wire electrode 14 consisting of gold (Au) and an anode electrode as a second thin wire electrode 15 consisting of copper (Cu) were arranged in a comb shape, as shown in FIG. 8, to form a condensation detection unit 41.

Figure 8:
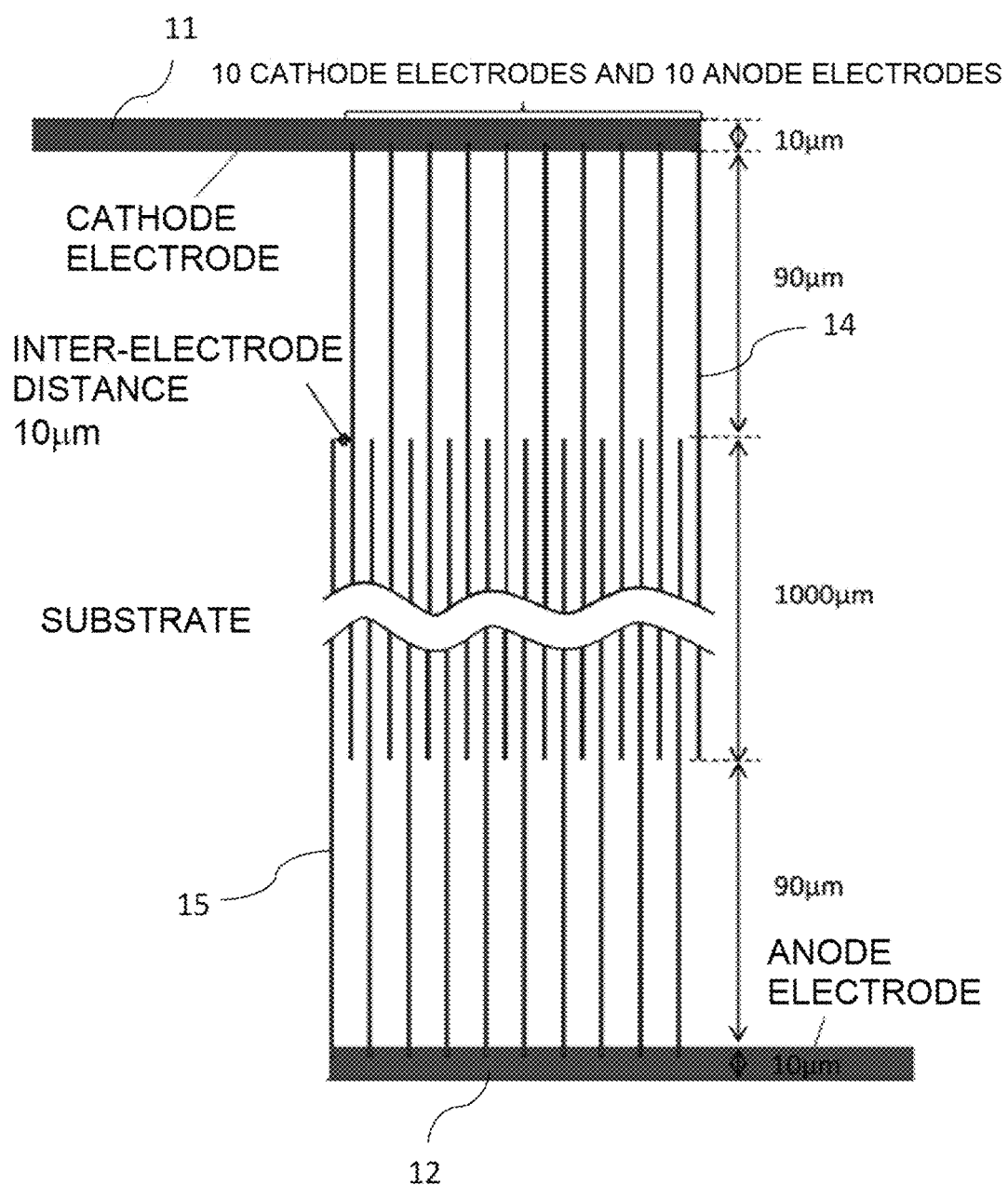
FIG. 8 is a plan view showing Example of electrode layout of a condensation detection unit.

FIG. 8 shows the layout of the first thin wire electrode 14, the second thin wire electrode 15, a first electrode 11, and a second electrode 12 used in Example 1.

Ten cathode electrodes and ten anode electrodes were prepared and were arranged in parallel with each other over a length of 1000 μm. Herein, an inter-electrode distance (spacing between the electrodes) was set to 10 μm.

Figure 9:
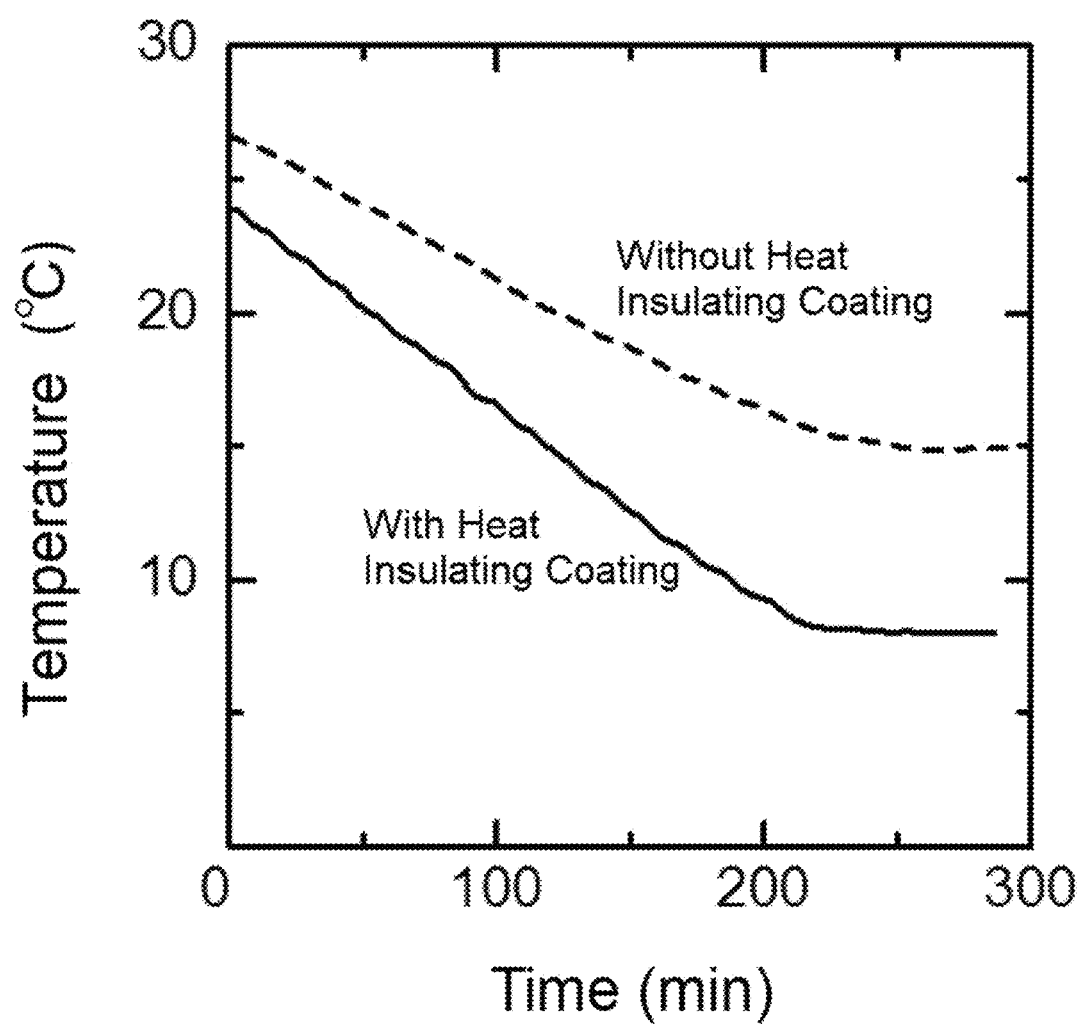
FIG. 9 is a characteristic diagram showing elapsed time dependence of the temperature of the condensation detection unit.

The condensation detection element 106 was placed on a Peltier element serving as an object of interest 30. The temperature of the Peltier element was set to 8° C., and the variation with time in surface temperature of the condensation detection unit 41 of the condensation detection element 106 was measured. At this time, temperatures were measured with and without a heat insulating coating film that covers the condensation detection unit 41. Results are shown in FIG. 9. Here, urethane foam resin was used as the heat insulating coating film, and aluminum alloy was used as a heat sink 16 of the condensation detection element 106.

As shown in FIG. 9, the surface temperature of the condensation detection element 106 decreased substantially linearly reflecting the temperature of the Peltier element or the object of interest 30 and became stable in about 200 minutes. At that time, the temperature of the condensation detection element 106 without the heat insulating coating film was 15° C. which was about 7° C. higher than the temperature of the object of interest 30, and the temperature of the condensation detection element 106 with the heat insulating coating film was 8° C. which was equal to the temperature of the Peltier element.

The results show that the condensation detection element according to an embodiment of the present invention enables operation at a temperature close to the temperature of an object of interest and that covering the condensation detection element with a heat insulating coating film enables operation at a temperature much closer to the temperature of the object of interest.

Figure 10:
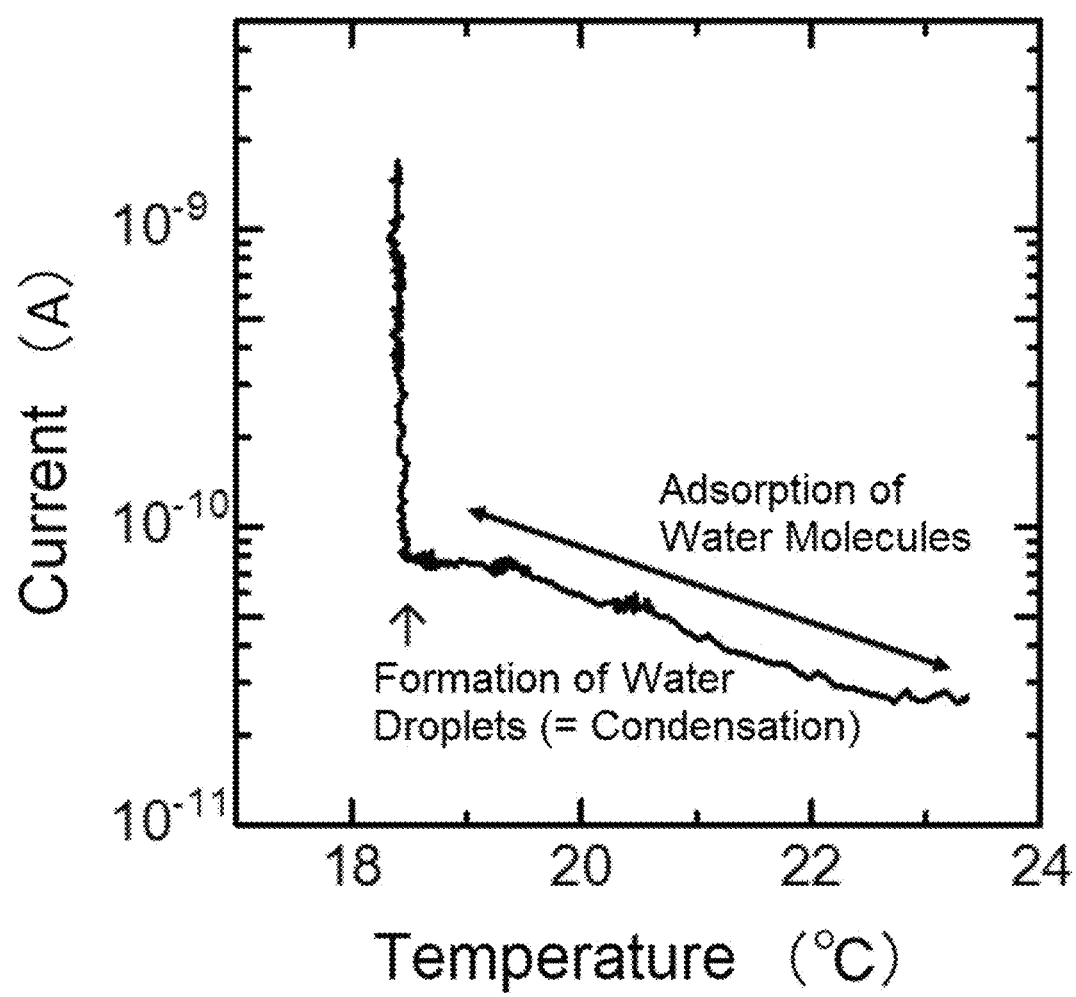
FIG. 10 is a characteristic diagram showing a relation between the temperature of an object of interest and a detected current.

Next, the condensation detection element 106 was placed on a Peltier element serving as a simulated object of interest 30. Temperatures of the Peltier element were changed from 24° C. to 18° C., and an output current of the condensation detection element 106 during the change was measured. Results are shown in FIG. 10.

With a decrease in temperature of the Peltier element, the output current of the condensation detection element 106 increased linearly due to the adsorption of water molecules, and the current increased sharply at about 18.3° C. The reason is that water droplets are formed at this temperature and cause condensation. In fact, the inventor visually observed the occurrence of condensation at this temperature. Furthermore, comparing the value of the output current and the inflection point of the output current curve with the noise, the output current characteristics show that an S/N ratio sufficient for detecting the occurrence of condensation is secured.

These results demonstrate that condensation depends on the temperature of an object of interest and that the occurrence or presence of condensation can be detected by the condensation detection element according to an embodiment of the present invention.

Example 2

In Example 2, a relation between detection of condensation and temperatures and humidities of a condensation detection unit and an environment was investigated.

Figure 11:
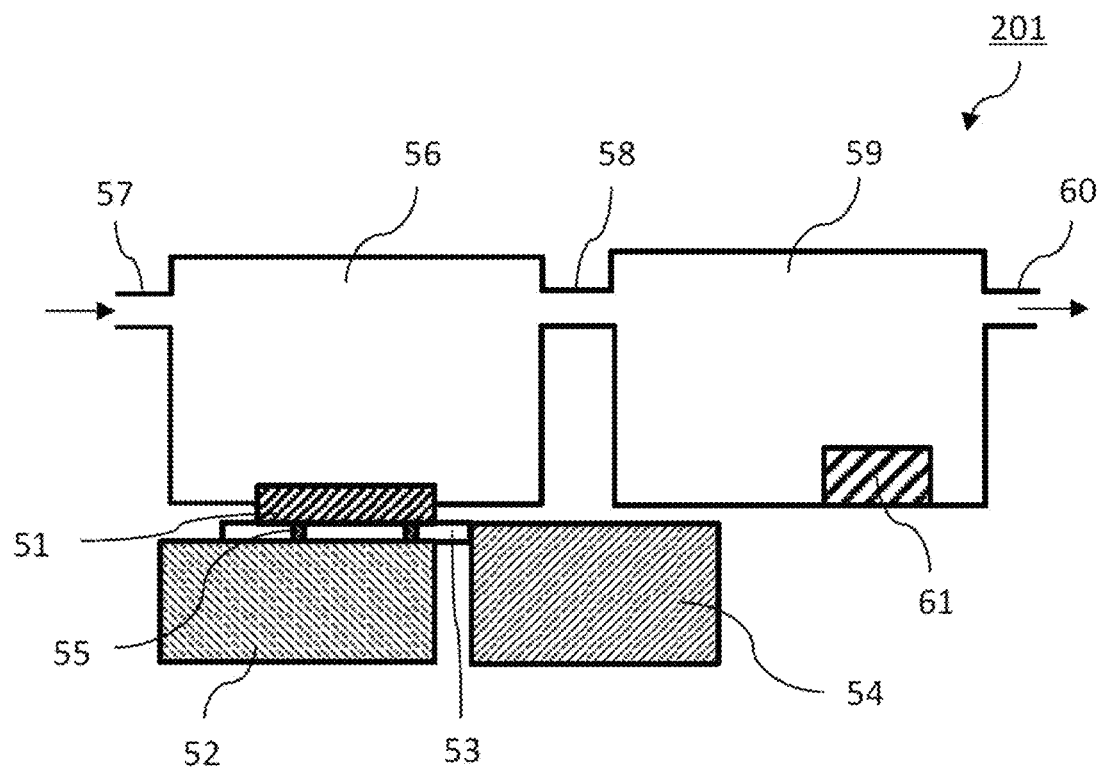
FIG. 11 is a cross-sectional view showing a configuration of an evaluation device for evaluating characteristics of the condensation detection element.

FIG. 11 shows a configuration of a characterization device 201 used for the measurement.

The characterization device 201 was provided with a condensation detection unit 51, a peripheral circuit and measurement circuit unit 52, a thermal conductive substrate (Al fork) 53, a Peltier element 54, a wire 55, a test chamber 56, a humidity control air inlet 57, and a venting pipe 58, a buffer chamber 59, an exhaust port 60, and a temperature and humidity measuring device 61.

The condensation detection unit 51, a ceramic package, and the measurement circuit unit 52 comprising the peripheral circuit were included in a condensation detection element.

The condensation detection unit 51 was prepared using a silicon substrate having a thickness of 500 μm and having a surface covered with a silicon oxide film. On the silicon substrate, a cathode electrode serving as a first thin wire electrode consisting of gold (Au) and an anode electrode serving as a second thin wire electrode consisting of aluminum (Al) were arranged in a comb shape. A spacing between first and second thin wire electrodes was set to two levels, 10 μm and 0.5 μm. Both the first and second thin wire electrodes were designed to have a thickness of 150 nm and a width of 1 μm. The size of the condensation detection unit was 5 mm×5 mm.

The condensation detection unit 51 having a high thermal conductivity and a low heat capacity was housed in the ceramic package (manufactured by Kyocera Corporation) having a bottom in contact with the thermal conductive substrate 53 consisting of the Al fork. The temperature of the thermal conductive substrate 53 was controlled by the Peltier element 54. Accordingly, the condensation detection unit 51 could control the temperature to a desired value, and the temperature was monitored by a thermometer using a platinum (Pt) wire provided in the condensation detection unit 51.

The condensation detection unit 51 was electrically connected to the peripheral circuit and measurement circuit unit 52 via the wire 55. An amplifier, an A/D converter, and the like were incorporated in the peripheral circuit and measurement circuit unit 52, and characteristics thereof were calibrated with a semiconductor analyzer (B1500A manufactured by Agilent technologies).

The condensation detection unit 51 was placed in the test chamber 56 having a capacity of 130 cm³. Air having a temperature and humidity controlled was introduced into the test chamber 56 through the humidity control air inlet 57. The introduced air was discharged via the venting pipe 58 from the exhaust port 60 disposed in the buffer chamber 59 having a volume of 130 cm³. Here, an amount of humidity-adjusted air introduced was 200 sccm, and me-40DPPT-MFC (manufactured by Micro Equipment) was used to adjust the humidity of the air.

A temperature and humidity measuring device (EE23 manufactured by E+E Electronic) was placed in the buffer chamber 59 to enable monitoring of environmental temperatures and environmental humidities at the condensation detection unit 51.

Figure 12:
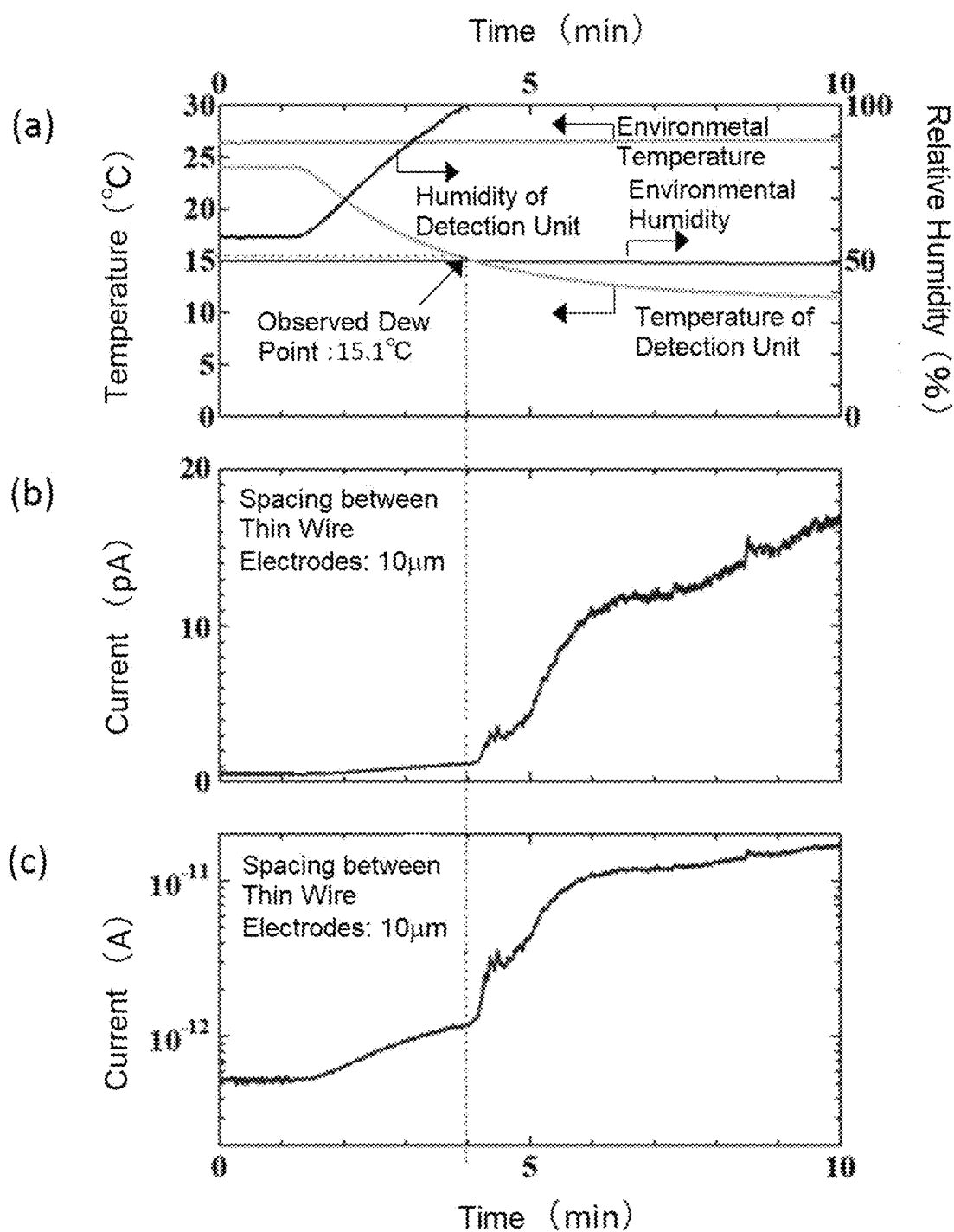
FIG. 12 is a characteristic diagram showing detection characteristics of the condensation detection element.

FIGS. 12(a)-(c) show results of condensation detection of this condensation detection element using temperatures and humidities of the detection unit, and environmental temperatures and environmental humidities as parameters. FIG. 12(a) shows temperatures and humidities of the detection unit, and environmental temperatures and environmental humidities. FIGS. 12(b) and 12(c) show currents detected by the detection unit with a spacing between the first and second thin wires set to 10 μm. Note that FIG. 12(c) is a view for checking the reproducibility of FIG. 12(b).

As can be seen from FIG. 12(a), the environmental temperature (26° C.) and the environmental (relative) humidity (50%) were constant over the observed time of 10 minutes. However, using the Peltier element 54 and the Al fork 53 as a kind of heat sink, when the temperature of the detection unit decreased, the humidity of detection unit increased to cause condensation on the detection unit. Condensation on the detection unit was visually observed with a microscope provided on the detection unit. The condensation (dew point) observed was 15.1° C. On the other hand, the theoretical dew point was 15.2° C. With a margin of error, the dew point observed was almost equal to the theoretical dew point.

As shown in FIGS. 12(b) and 12(c), the current detected by the condensation detection unit of this condensation detection element rose sharply at the time of observing condensation. The results demonstrate that condensation is detected with sufficiently high accuracy by this current detection.

The experiment shows that condensation is caused by the temperature and humidity of a target surface where condensation occurs but not by the environmental temperature and environmental humidity.

Furthermore, as in this Example, the experiment shows that to cover the condensation detection unit 51 having a high thermal conductivity and a low heat capacity with a ceramic package having a low thermal conductivity and to thermally separate the peripheral circuit and measurement circuit unit 52 and the like enables accurate detection of the occurrence of condensation on the Al fork 53 or a target surface on which condensation is to be observed.

In other words, regarding the Al fork 53 as a heat sink, the experiment shows that to cover the condensation detection unit 51 having a high thermal conductivity and a low heat capacity with a ceramic package having a low thermal conductivity, to place the heat sink, and to thermally separate the peripheral circuit and measurement circuit unit 52 and the like enables accurate detection of the occurrence of condensation on a target surface (Peltier element 54) with which the heat sink (Al fork 53) is in contact and on which condensation is to be observed.

Figure 13:
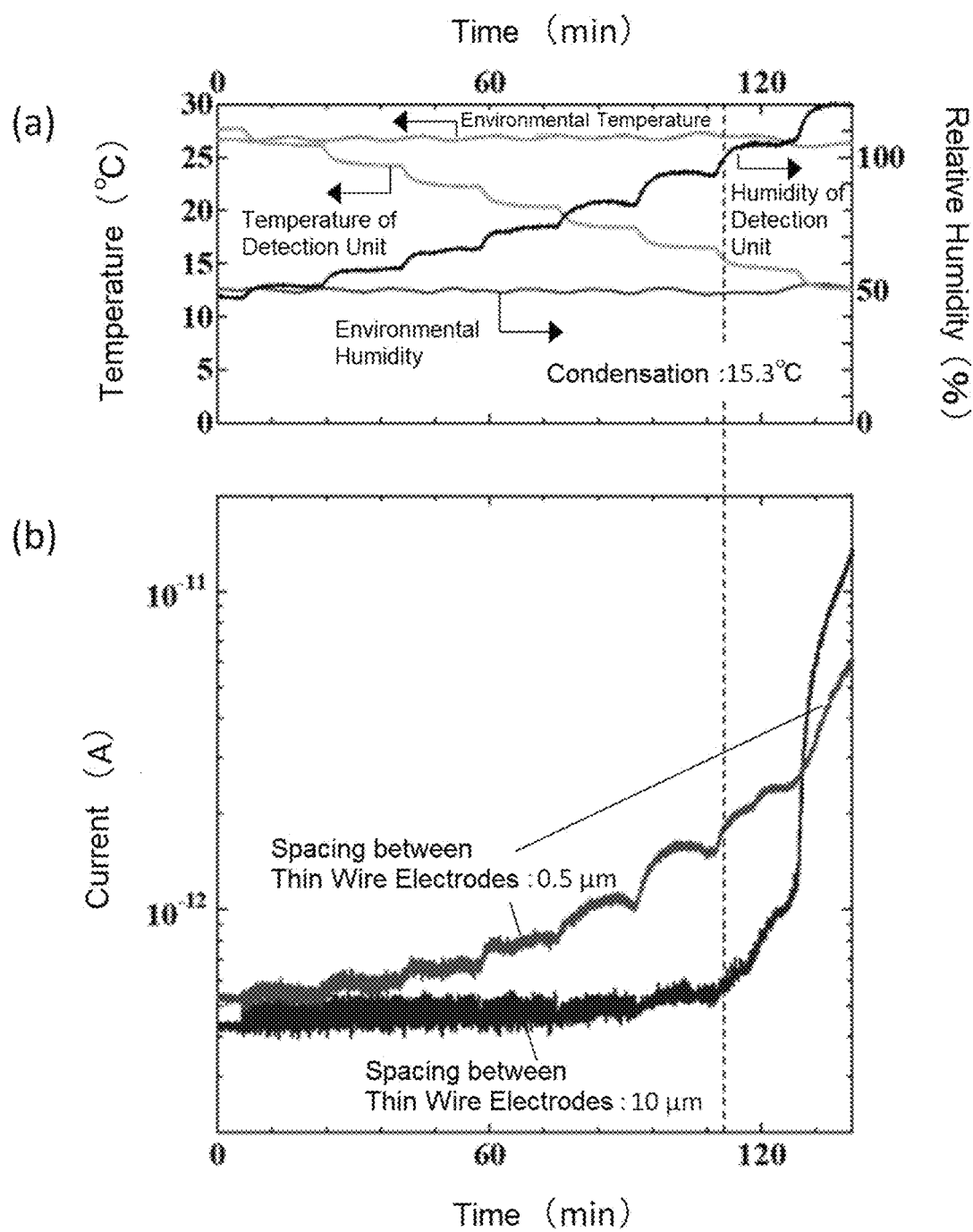
FIG. 13 is a characteristic diagram showing detection characteristics of the condensation detection element.

FIGS. 13(a) and (b) show the second condensation detection result of this condensation detection element using temperatures and humidities of the detection unit, and environmental temperatures and environmental humidities as parameters. FIG. 13(a) shows temperatures and humidities of the detection unit, and environmental temperatures and environmental humidities. FIG. 13(b) shows currents detected by the detection unit with a spacing between the first and second thin wires set to 10 μm and 0.5 μm. FIGS. 12(a)-(c) and FIGS. 13(a) and (b) are different in timescale. In FIGS. 13(a) and (b), temperatures and humidities of the detection unit were slowly changed with a small amplitude.

As can be seen from FIG. 13(a), the temperature (26° C.) and the (relative) humidity (50%) of an environment were almost constant over the observed time of 130 minutes. However, using the Peltier element 54 and the Al fork 53 as a kind of heat sink, when the temperature of the detection unit decreased, the humidity of detection unit increased to cause condensation on the detection unit. Condensation on the detection unit was visually observed with a microscope provided on the detection unit. The condensation observed was 15.3° C.

As shown in FIG. 13(b), the current detected by the condensation detection unit of this condensation detection element rose sharply at the time of observing condensation. The results demonstrate that condensation is detected with sufficiently high accuracy by this current detection.

The experiment shown in FIGS. 13(a) and (b) also indicates that condensation is caused by the temperature and humidity of a surface where condensation occurs but not by the environmental temperature and environmental humidity.

Furthermore, as in this Example, the experiment shows that to cover the condensation detection unit 51 having a high thermal conductivity and a low heat capacity with a ceramic package having a low thermal conductivity and to thermally separate the peripheral circuit and measurement circuit unit 52 and the like enables accurate detection of the occurrence of condensation on the Al fork 53 or a target surface on which condensation is to be observed.

In other words, regarding the Al fork 53 as a heat sink, the experiment shows that to cover the condensation detection unit 51 having a high thermal conductivity and a low heat capacity with a ceramic package having a low thermal conductivity, to place the heat sink, and to thermally separate the peripheral circuit and measurement circuit unit 52 and the like enables accurate detection of the occurrence of condensation on a target surface (Peltier element 54) with which the heat sink (Al fork 53) is in contact and on which condensation is to be observed.

The condensation detection element according to an embodiment of the present invention is suitable for detecting not only condensation on an object of interest as described above but also minute water droplets and water films (not reaching the size of condensation) before condensation occurs on the object of interest.

As similar to condensation, such minute water droplets and water films more or less affect the formation and growth of rust, the corrosion of members such as metals, changes in frictional force, and the breeding and growth of mold. Accordingly, detecting minute water droplets and water films is useful.

In addition, enabling the detection of such minute water droplets and water films is useful for taking efficient measures to prevent condensation. For example, an air conditioner or a heater may be activated before condensation occurs on an object of interest.

In FIG. 13(b), when the spacing between the first and second thin wire electrodes was 0.5 μm, the current increased from the time before the occurrence of condensation, and minute water droplets and water films before condensation were detected. This was observed with a microscope. Water was present in a part between the first and second thin wire electrodes, and a galvanic current flowed therethrough.

The condensation detection element according to an embodiment of the present invention also enables accurate detection of minute water droplets and water films before condensation in an environment on an object of interest. Accordingly, the condensation detection element according to an embodiment of the present invention serves as a detection element that efficiently prevents condensation and as a quantification element associated with phenomena such as the formation and growth of rust, the corrosion of members such as metals, changes in frictional force, and the breeding and growth of mold.

INDUSTRIAL APPLICABILITY

Condensation generally causes various troubles such as mold, corrosion, mist, and deterioration of food quality. This is why detection of condensation is of great interest.

As described above, the condensation detection element according to the present invention enables detection of condensation on an object of interest with high sensitivity, high accuracy, and quickly (high speed and responsivity) and serves as a monitor for adequate management of condensation. Accordingly, it is highly likely that the condensation detection element is used for various applications from consumer use to industrial use.

REFERENCE SIGNS LIST

10 First substrate unit (first substrate or condensation sensor unit substrate)
11 First electrode
12 Second electrode
14 First thin wire electrode (thin wire electrode of first metal or cathode electrode)
15 Second thin wire electrode (thin wire electrode of second metal or anode electrode)
16 Heat sink
20 Second substrate unit (Second substrate or peripheral circuit unit substrate)
21 Peripheral circuit input electrode
22 Peripheral circuit input electrode
23 Peripheral circuit main part
24 Wire
25 Output electrode
26 Output electrode
28 Peripheral circuit input electrode
29 Wireless output unit
30 Object of interest
31 Wire
32 Wire
33 Wire
34 Breathable heat insulating film
40 Substrate
41 Condensation detection unit (first substrate unit)
42 Peripheral circuit unit (second substrate unit)
51 Condensation detection unit
52 Peripheral circuit and measurement circuit unit
53 Thermal conductive substrate (Al fork)
54 Peltier element
55 Wire
56 Test chamber
57 Humidity control air inlet
58 Venting pipe
59 Buffer chamber
60 Exhaust port
61 Temperature and humidity measuring device
101 Condensation detection element 102 Condensation detection element
103 Condensation detection element
104 Condensation detection element
105 Condensation detection element
106 Condensation detection element
111 Condensation detection unit
112 Peripheral circuit unit
113 Condensation detection unit
114 Peripheral circuit unit
210 Characterization device

The invention claimed is:

1. A condensation detection element comprising
a condensation detection unit, the condensation detection unit being formed on a first substrate unit, and
a peripheral circuit unit, the peripheral circuit unit being formed on a second substrate unit,
wherein the condensation detection unit comprises a thin wire electrode of a first metal and a thin wire electrode of a second metal, the second metal being different from the first metal,
wherein the thin wire electrode of the first metal and the thin wire electrode of the second metal are disposed in juxtaposition with each other,
wherein the condensation detection unit is configured to detect the presence or absence of water droplet that comes into contact with the thin wire electrode of the first metal and the thin wire electrode of the second metal by a current flowing between the thin wire electrode of the first metal and the thin wire electrode of the second metal,
wherein the peripheral circuit unit comprises at least an output unit that outputs an electrical signal when condensation due to the water droplet is detected, and
wherein the first substrate unit has a higher thermal conductivity and a lower heat capacity than the second substrate unit.

2. The condensation detection element according to claim 1, wherein the first substrate unit has a higher thermal conductivity per unit area and a lower heat capacity per unit area than the second substrate unit.

3. The condensation detection element according to claim 1, wherein the first substrate unit has a structure that comes into direct contact with an object of interest.

4. The condensation detection element according to claim 1, wherein the first substrate unit comprises a heat sink unit.

5. The condensation detection element according to claim 1, wherein the first substrate unit is surrounded by a member having a lower thermal conductivity than the first substrate unit except for a side in contact with an object of interest.

6. The condensation detection element according to claim 1, wherein the first substrate unit is surrounded by the second substrate unit.

7. The condensation detection element according to claim 1, wherein the first substrate unit is disposed separately from the second substrate unit.

8. The condensation detection element according to claim 1, wherein the first substrate unit has a smaller thickness than the second substrate unit.

9. The condensation detection element according to claim 1, wherein the condensation detection unit is electrically connected to the peripheral circuit unit by a bonding wire.

10. The condensation detection element according to claim 1, wherein the peripheral circuit unit comprises at least one selected from a group consisting of electrical signal amplification unit, current voltage conversion unit, analog digital signal conversion unit, binarization unit for 0/1 signals, wireless transmission unit, signal terminal unit, and power supply unit.

11. The condensation detection element according to claim 1, wherein the first metal is selected from a group consisting of gold, platinum, silver, titanium, and an alloy thereof.

12. The condensation detection element according to claim 1, wherein the second metal is selected from a group consisting of silver, copper, iron, zinc, nickel, cobalt, aluminum, tin, chromium, molybdenum, manganese, magnesium, and an alloy thereof.

13. The condensation detection element according to claim 1, wherein the spacing between the thin wire electrode of the first metal and the thin wire electrode of the second metal is in a range of 5 nm or more and 200,000 nm or less.

14. The condensation detection element according to claim 1,
comprising a plurality of at least one selected from a group consisting of the thin wire electrode of the first metal and the thin wire electrode of the second metal,
wherein the thin wire electrode of the first metal extends from a first side towards a second side that is opposite to the first side and the thin wire electrode of the second metal extends from the second side towards the first side such that the thin wire electrode of the first metal and the thin wire electrode of the second metal are arranged in parallel with each other.

15. The condensation detection element according to claim 1, wherein the first substrate unit comprises a member in which an insulating film is formed on at least one material selected from a group consisting of aluminum, copper, silicon, diamond, and graphite, or on an alloy or compound comprising at least one selected from a group consisting of aluminum, copper, silicon, and carbon.

16. The condensation detection element according to claim 1, wherein the second substrate unit comprises at least one member selected from a group consisting of resin, glass, and ceramics.

* * * * *